United States Patent

Biezeveld

[15] 3,654,396

[45] Apr. 4, 1972

[54] TELEPHONE SCREENING SYSTEM

[72] Inventor: Nicolaas Biezeveld, 17 Coronet Ave., Mill Valley, Calif. 94941

[22] Filed: Oct. 24, 1969

[21] Appl. No.: 869,209

[52] U.S. Cl. ..........................................................179/18 D

[51] Int. Cl. ..........................................................H04m 3/38

[58] Field of Search .........................179/18 D, 18 DA, 2 A, 5

[56] References Cited

UNITED STATES PATENTS

| | | | |
|---|---|---|---|
| 3,508,011 | 4/1970 | Dehlen et al. | 179/18 DA X |
| 3,492,426 | 1/1970 | Foreman et al. | 179/5 |
| 3,431,363 | 3/1969 | Miller | 179/18 D |
| 3,390,234 | 6/1968 | Glidden | 179/2 A X |
| 3,384,713 | 5/1968 | Duncan | 179/2 A |
| 3,130,271 | 4/1964 | Habisohn | 179/18 DA |

*Primary Examiner*—Kathleen H. Claffy
*Assistant Examiner*—Thomas W. Brown
*Attorney*—Townsend and Townsend

[57] ABSTRACT

A system for screening incoming telephone calls for use in a conventional telephone system of telephone calling and receiving stations and central office equipment in which a line adapter receives at a telephone station, signals initiated by a calling station and establishes a communication path between the telephone receiving station and calling station. Logic circuitry for receiving and processing additional signals initiated by the calling station identifies such additional signals, compares the additional signals with a program code for validation, and actuates an indicator if the additional signals are validated.

10 Claims, 4 Drawing Figures

INVENTOR.
NICOLAAS BIEZEVELD
BY
Townsend and Townsend
ATTORNEYS

INVENTOR.
NICOLAAS BIEZEVELD
BY
Townsend and Townsend
ATTORNEYS

INVENTOR.
NICOLAAS BIEZEVELD
BY
Townsend and Townsend
ATTORNEYS

TELEPHONE SCREENING SYSTEM

This invention relates to a new system for screening incoming telephone calls for use in a conventional telephone system of telephone calling and receiving stations and central office equipment.

It is an object of the present invention to provide a new telephone screening system which prevents indication at a telephone station of an incoming call unless a predetermined code signal is initiated at the calling station following and in addition to the conventional telephone number of the telephone receiving station.

Another object of the invention is to provide a system for screening incoming telephone calls applicable for both pulse digital and multi-frequency dial addressing telephone systems.

In order to accomplish these results, the present invention contemplates providing a line adapter installed at a telephone station for receiving signals initiated by the calling station and for establishing a communication path between the telephone receiving station and calling station. The conventional telephone bell is disconnected for actuation of alternative indicating means as hereinafter described.

The invention also contemplates provision of electronic and logic circuitry for receiving and processing additional signals initiated by the calling station, for identifying the additional signals, comparing the additional signals with a programmed code for validation, and for providing a validation signal for actuating an indicator at the telephone receiving station.

A feature and advantage of the invention is that all incoming telephone calls are screened and only those telephone calls in which the appropriate code signals are initiated by the calling station, in addition to the conventional telephone number, actuate an indicator means at the telephone receiving station. After the conventional telephone number is dialed or initiated from a calling station, the invention contemplates originating a signal from the telephone receiving station indicating that a screening system is coupled to the receiving station, thereby requiring initiation of additional signals at the calling station in order to complete the call. If additional signals initiated at the calling station are validated at the receiving station, an indicator at the telephone receiving station is actuated.

Logic circuitry generally accomplishes the functions of identifying pulses in a train of pulses initiated at the calling station and of formatting the pulses for input to a programmed matrix. The programmed matrix provides output signals only in response to input data corresponding to a preselected code which may be, for example, a digit sequence. Validation circuitry following the programmed matrix generates a validation signal for indicating validation of the additional signals initiated by the calling station.

In one embodiment of the invention adapted for digital dial addressing telephone systems, the logic circuitry includes a binary counter for counting the number of pulses in a train of pulses initiated by the calling station, and an additional counter for counting the number of pulses trains. Digit formation gates format each pulse train as a digit corresponding to the number of pulses comprising the pulse train for input to a programmed selector matrix. The selector matrix is provided with a plurality of inputs corresponding to digits and a plurality of outputs, one corresponding to each digit programmed in the matrix. The selector matrix is programmed with a first set of digits in a defined sequence and is formed to provide an output signal only upon receipt of an input signal corresponding to a programmed digit. Validation circuitry responsive to the outputs from the program selector matrix provides a validation signal only upon receipt of sequential output signals from the selector matrix in the sequence of the digits programmed in the selector matrix. The validation signal is used to actuate an indicator at the telephone receiving station.

In order to accomplish sequencing in the validation of digit signals received at the input to the program selector matrix in the above embodiment, a gating circuit responsive to the number sequence of the digit pulse train being validated is provided for gating the output from selector matrix to permit an output signal only at the output for the position in the programmed digit sequence corresponding to the number position of the digit pulse being validated.

For multi-frequency dial addressing telephone system applications, the logic circuitry for receiving and processing additional signals initiated at the calling station includes a multi-frequency selector comprising a plurality of band pass frequency filters for identifying the frequency of pulses in a pulse train. Digit formation gates format the multi-frequency pulses into digits according to the frequency of pulses in a pulse train. The formatted pulse train data is thereafter fed to the program selector matrix as heretofore described.

According to another aspect of the invention, timing means is provided for disconnecting the communication path established between the telephone calling and receiving stations when a validation signal is not generated by the circuitry at the receiving station within a specified time period. Thus, in the event that additional signals are not initiated by the calling station or if the additional signals are incorrect and fail to correspond with the code programmed in the selector matrix, or if the sequence is incorrect, the communication path established by the line adapter between the calling and receiving stations is automatically disconnected. A feature and advantage of the telephone screening system of the present invention is that the screening system can be by-passed at the receiving station by merely lifting the telephone receiver off the hook.

According to another embodiment of the invention, the programmed selector matrix is programmed with a second set of digits in specified sequence and a second set of outputs corresponding to the digits of the second programmed sequence of digits. The validation circuitry following the programmed selector matrix is also provided with means for generating a second validation signal upon validation of input signals to the selector matrix corresponding in value and sequence to the second set of programmed digits. A second type of indicator can therefore be provided at the telephone station for actuation by the second validation signal, generated in response to initiation at the calling station of the second set of programmed digits. In this embodiment of the invention, additional circuitry can be provided to insure that either the first or second validation signal is generated only in response to either the first set of programmed digits alone or the second set of programmed digits alone, and not by a combination of digits from the first programmed sequence and the second programmed sequence in the selector matrix.

The programming of the selector matrix can be altered as often as desired, to any of the mathematic permutations and combinations provided by the number of digits.

Other objects, features and advantages of the present invention will become apparent in the following specification and accompanying drawings.

Figure 1:
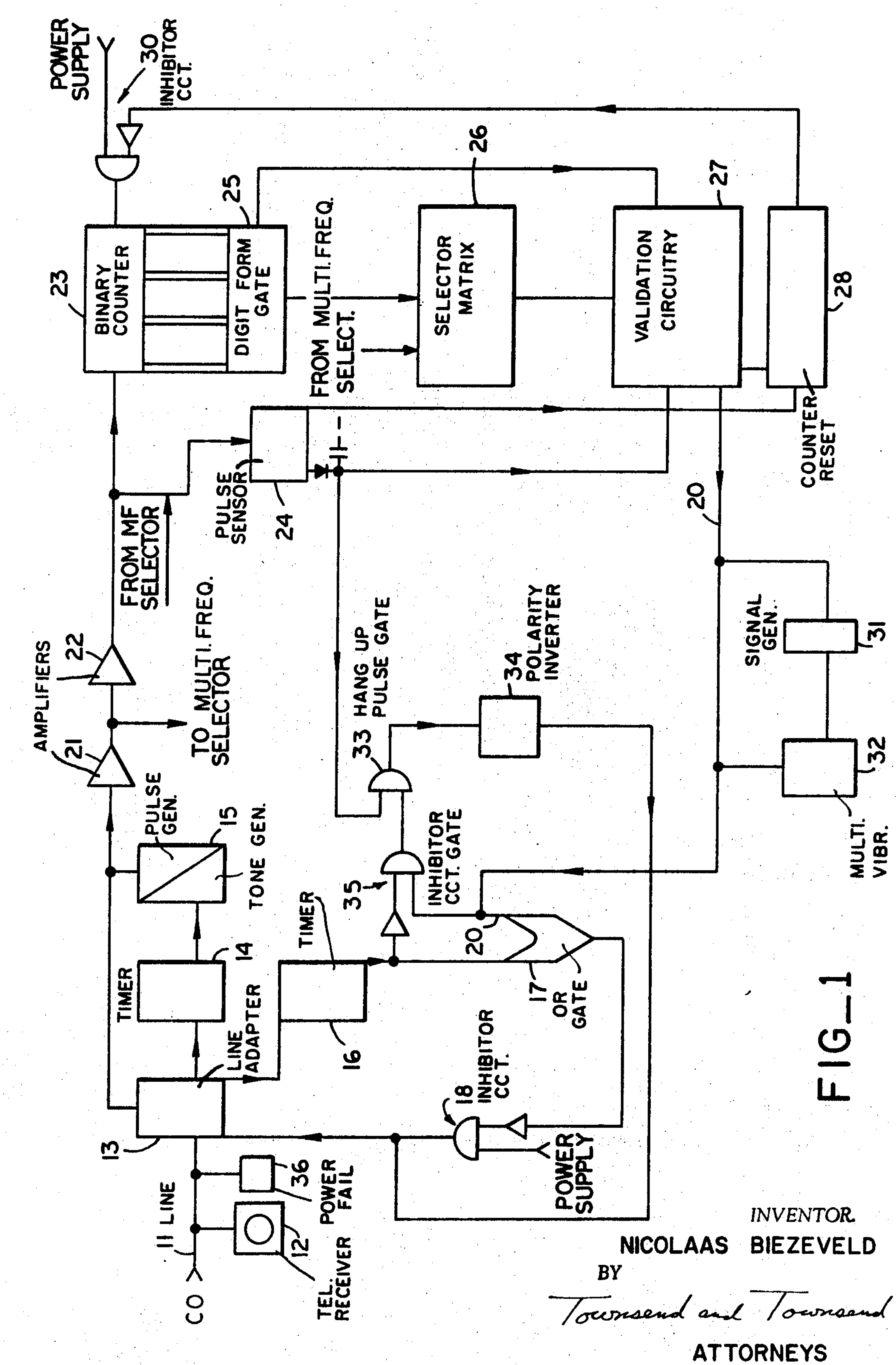
FIG. 1 is a block diagram showing a simplified telephone screening system for processing one code signal of one digit.

In the simplified embodiment of the present invention illustrated in FIG. 1, line 11 represents the line from the central office equipment of a telephone company directed through a local telephone receiver 12 from which the conventional telephone bell has been disconnected. Coupled across the line 11 from the central office equipment at the telephone receiving station is a line adapter 13 which includes an artificial capacitance in the form of a capacitor and an inductor connected across the telephone line in order to simulate the capacitance which the telephone bell would otherwise present across the telephone lines. Briefly, the line adapter 13 also includes a first relay actuated by the generating current or bell-ringing current received from central office equipment. The standard bell or generating current is approximately 100 to 105 volts AC at approximately 20 to 30 cycles per second. The first relay in turn actuates a second relay connected across the telephone lines to provide an impedance of approximately 600 ohms across the telephone lines. This is the impedance which normally would appear across the telephone lines when the telephone call is answered by lifting the telephone receiver off it. The change in impedance is sensed by the central office equipment which thereafter establishes a talking path between the calling telephone and the receiving station. Thus, the line adapter 13 eliminates the normal procedure in which the talking path between the calling and receiving telephone station is established by central office equipment only after the telephone receiver is lifted off the hook in answering a telephone call. According to the present invention, the conventional telephone bell at the receiver is disconnected, and the line adapter 13 is formed to automatically establish the talking path between the calling and receiving telephone. With the creation of a talking path between the calling and receiving telephones, the generating current ceases and central office equipment establishes a potential of 48 volts across the telephone line. This potential maintains the second relay of the line adapter 13 in an energized state. This second relay, in turn, maintains the power supply to the primary winding of the first relay. With the first relay of the line adapter 13 in operating condition, the remaining circuitry of the screening system is conditioned to operate. If the telephone line circuit is open at any time, as by the central office equipment shutting off the potential appearing across the telephone lines, the relays and line adapter 13 open disconnecting the talking path between the calling and receiving telephones. This expedient insures compliance with laws in certain states with respect to telephone engineering.

With the line adapter relays functioning, the potential at one output from line adapter 13 actuates a short timer of, for example, from 1 to 2 seconds. The timer 14 provides power for driving a pulse generator and tone generator 15. The pulse generator and tone generator 15 consists, for example, of a flip-flop whose output alternately activates a two-tone generator. The output from the generator 15 is transferred along the talking path to the calling station to thereby indicate that the telephone receiving station is coupled with a telephone screening system, thereby requiring initiation of additional signals at the calling station. Thus, the purpose of the short tone of one or two seconds is to provide an indication to the caller that he is faced with a screening system. Instead of a tone generator, a recording could be used in which case the output timer 14 could be utilized directly to operate a recording or announcement to the calling station.

At the same time, the potential from the output of line adapter 13 operates a longer timer 16 which may be adjusted to provide an output for a duration of, for example, ten to twelve seconds during which time additional signals must be initiated by the calling station for validation by, for example, dialing the appropriate additional digit or digits. If appropriate signals are not initiated by the calling station, the call is abandoned and the circuit disconnected after the timing period during which timer 16 provides an output. During the ten to twelve seconds of operation of timer 16, a potential signal is provided to OR gate 17. The signal at the output of OR gate 17 produces a zero level output from inhibitor circuit 18. After operation of the timer for ten to twelve seconds, if validation of additional signals initiated by the calling station has not occurred, the output from timer 16 ceases so that no output is provided from OR gate 17. Thus, if validation of additional signals initiated at the calling station as hereinafter described does not occur, there will be no signal at line 20 to OR gate 17. With no output from OR gate 17, a signal potential appears at the output from inhibitor circuit 18. This signal activates the secondary winding of the first relay in line adapter 13. The secondary winding is reverse wound to nullify the core magnetization of that relay. The first relay is therefore opened resulting in opening of the second relay and the talking path established between the calling and receiving stations is disconnected as are all power supplies to the screening system as hereinafter described. The telephone equipment is therefore returned to its initial state preparatory to receiving additional telephone calls. In the event that a calling station initiates correct signals which are validated as hereinafter described, a validation signal is provided on line 20 to OR gate 29 and therefore to the inhibitor circuit 18, so that the talking path between the calling and receiving stations is maintained.

Additional signals initiated at the calling station appear across an audio transformer primary coil connected across the telephone lines. The additional potential signals initiated by the calling station are amplified by amplifier 21. In digital dialing telephone systems, the pulses received and amplified by amplifier 21 pass through pulse shaper and amplifier 22 to the binary counter 23 and at the same time to a pulse sensor 24. In a digital dialing system, the signals received and amplified are in the form of pulse trains, each consisting of a series of pulses corresponding in number to the digit represented by the pulse train. Binary counter 23 counts the number of pulses in a particular pulse train. The output from binary counter 23 passes to digit formation gate 25 which serves the function of formatting the binary data into a digit signal representing the digit value of the pulse train counted by binary counter 23. The digit signal from digit formation gate 25 is connected to the input of programmed selector matrix 26 programmed to provide an output signal to validation circuitry 27 only upon receipt of one or more preselected digit signals at its input. Thus, the selector matrix is pre-set or programmed to pass only one particular digit or a sequence of digits as described in other embodiments. At the same time that the pulses in a particular pulse train are counted, and formatted for validation, the presence of a pulse train is sensed by pulse train sensor 24 to provide a gating signal for gating the output from selector matrix 26 at the validation circuitry 27 to thereby provide a validation signal along line 20. Upon completion of processing of a single pulse train, counter re-set block 28 provides a signal for resetting binary counter 23 to its initial state via inhibitor circuit 30.

The validation potential signal along line 20 actuates a signal generating means 31 for driving, for example, a multivibrator 32 for, in turn, driving some type of signalling device or indicator at the telephone receiving station to alert anyone in the vicinity. At the same time, the validation signal potential along line 20 provides an output from OR gate 17 which maintains the talking path established between the calling and receiving stations as heretofore described.

In the event that at any time during the telephone call, the caller at the telephone calling station hangs up, a hang-up pulse is generated which passes along the communication path established between the calling and receiving stations through components 21 and 22 to the pulse sensor 24. A pulse signal is thereby provided to hang-up pulse gate 33 consisting of an AND gate. By means of inhibitor circuit 25 an output signal is also provided to gate 33 upon the concurrence of a validation signal along line 20 and upon completion of the timing period set at timer 16. Thus, if the caller hangs up after successfully establishing a telephone call, a signal is provided by a polarity inverter 34 to the secondary winding of the first relay to line adapter 21 which is reverse wound as heretofore described. The relays in line adapter 13 are thereby opened disconnecting the talking path established between the calling and receiving stations and at the same time disconnecting the power supplies to the telephone screening system as hereinafter described. This chain of events with regard to calling party disconnect thus provides system disconnect even in central telephone office applications where no electrical line conditions are changed upon calling party disconnect. As described, the audio modulation caused by calling station receiver replacement, i.e., the hang-up pulse, causes system restoration to the standby condition.

In the event that a caller were to hang up before completion of the timing period set for timer 16 or before attempting to validate his call, the line circuitry 13 relies upon the change in electrical condition provided across the telephone lines by central office equipment upon caller disconnect in order to restore the telephone receiving equipment to its initial condition.

A power fail relay 36 is connected across the telephone line in series with the conventional telephone bell, and the contacts of the power fail relay are biased in a normally closed position. However, the relay is actuated by the power supply for the screening system circuitry to maintain the contacts in an open position so that the conventional bell is normally disconnected and does not operate as long as the power supply to the screening system is operating. In the event that there is a failure of the power supply, the bell is therefore automatically connected back into the circuitry across the telephone lines to permit normal operation of the telephone.

Figure 3:
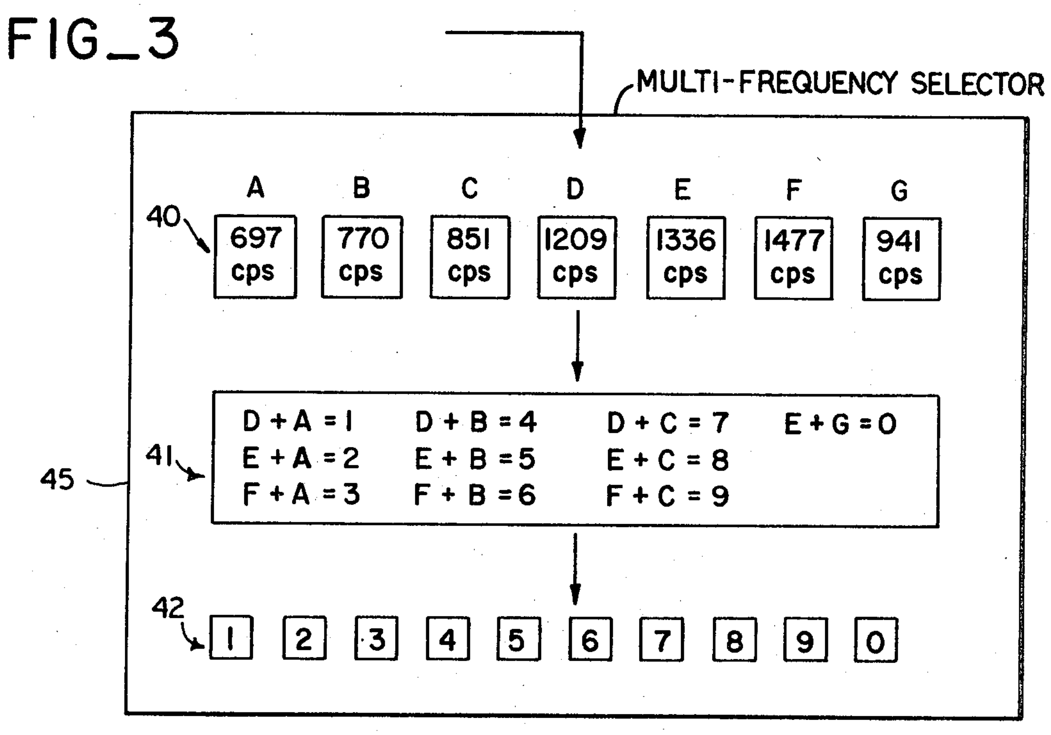
FIG. 3 is a block diagram of a portion of a telephone screening system for multi-frequency dial addressing telephone system applications.

In multi-frequency dial addressing telephone systems, the output from amplifier 21 is fed to a multi-frequency selector as shown in FIG. 3. The multi-frequency selector consists of an array of band pass filters 40 for providing outputs according to the frequency of pulses in a pulse train. The output from the multi-frequency sensor 40 is fed to digit formation gate 41 for formatting data to provide a digit signal according to the frequency of pulses comprising the pulse train. Digit translator 42 provides a digit signal output in response to the digit formation gates 41 for input to the program selection matrix and to pulse sensor 24, heretofore described. Operation of the system is otherwise the same.

Figure 2:
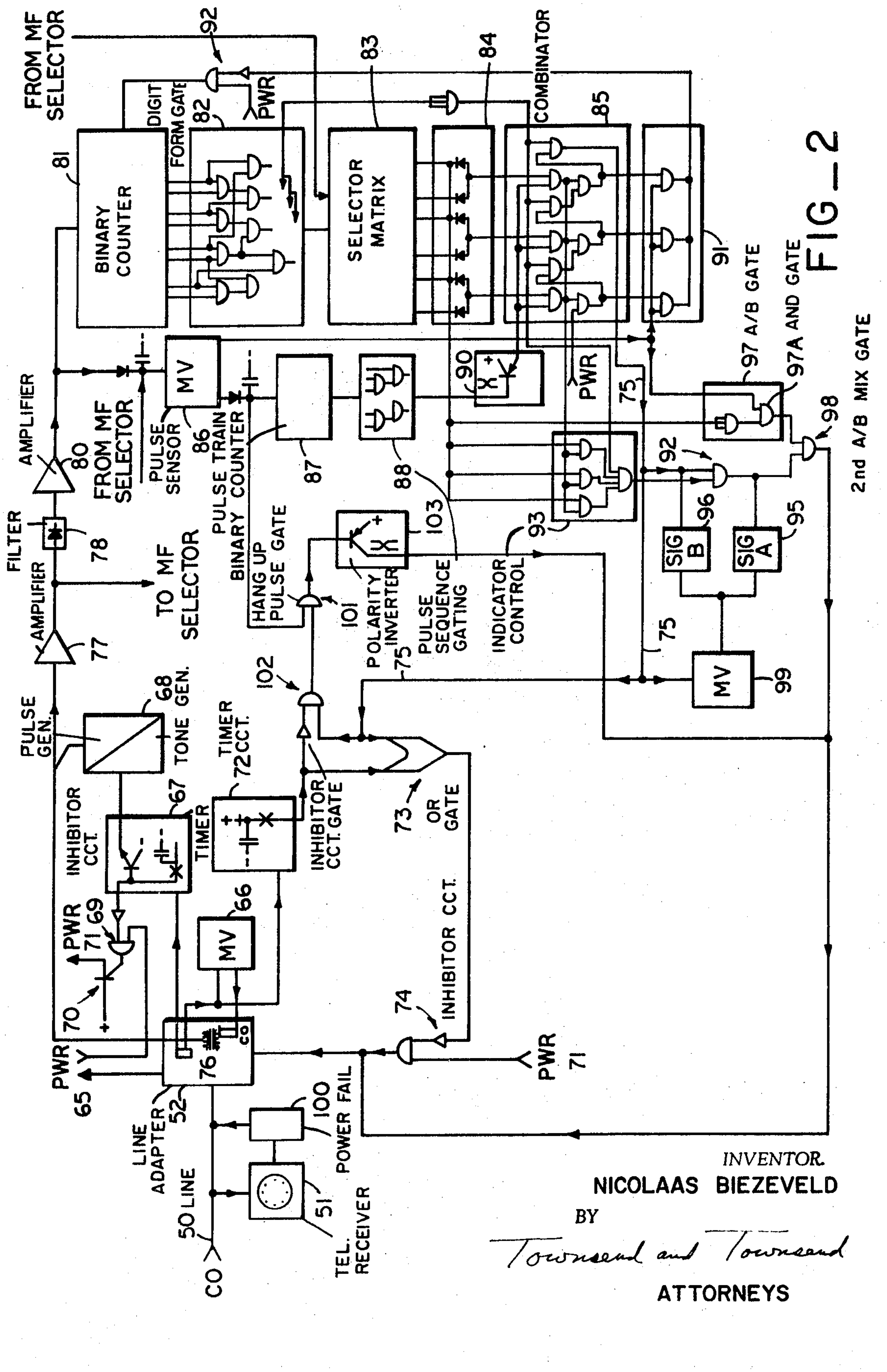
FIG. 2 is a block diagram showing a telephone screening system for handling two types of coded signals of three digits each.
Figure 4:
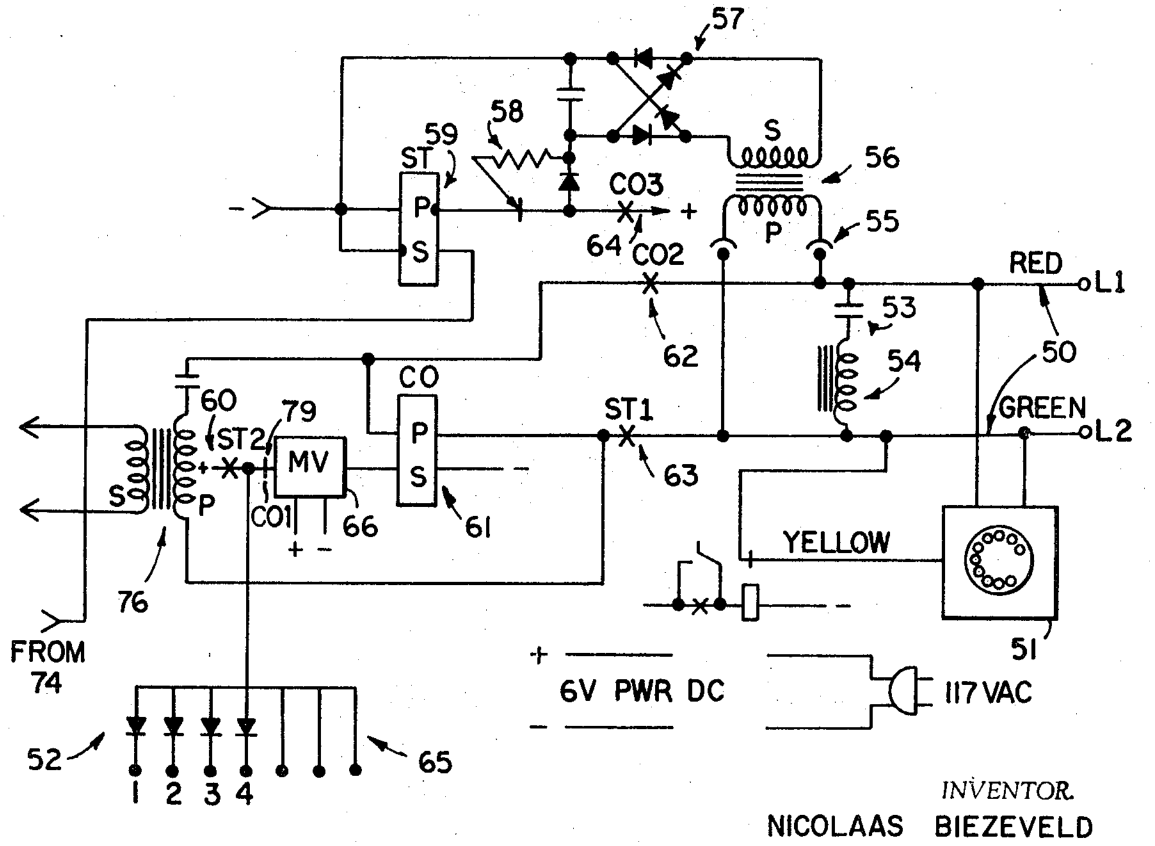
FIG. 4 is a schematic diagram of the line adapter for a telephone screening system.

The system for screening incoming telephone calls capable of validating two alternative code signals of three digits each is shown in FIG. 2. As in the previous example, the line 50 from central office equipment of a telephone company is directed to a local telephone receiver 51 from which the conventional telephone bell has been disconnected. Coupled across the line 50 from central office equipment is a line adapter 52. A particular example of a line adapter for use in the present invention is shown in more detail in FIG. 4. The line adapter 52 provides an artificial capacitance in the form of a capacitor 53 and inductor 54 connected across the telephone lines to provide a capacitance across the lines equivalent to that which the telephone bell would normally provide. When the standard bell ringing or generating current appears across the line 50 as the result of a call initiated at a calling telephone station, neon bulbs 55 are ionized providing a current to the primary winding of transformer 56. The current generated through the secondary winding of transformer 56 is rectified by a full wave rectifier 57. The resulting DC current gates itself through silicon controlled rectifier 58 to the primary winding of ST relay 59. The current through the primary winding of the ST relay actuates the relay which controls four secondary switches or contact points which are normally open. Actuation of the ST relay therefore closes switch 60 also designated ST 2 which permits operation of monostable-vibrator 66. Multivibrator 66 acts as a pulse stretcher for activation of the secondary winding of the CO relay 61. Actuation of the CO relay closes switch 62 also designated CO2. Because the switch 63, also designated ST 1 has already been closed by actuation of the ST relay, a complete holding path through the primary winding of the CO relay 61 along the telephone lines 50 is established. Actuation of the CO relay causes normally closed contacts 79, also designated $CO_1$, to open, thereby removing power from multi-vibrator 66, which maintains a current output of sufficient duration to maintain CO relay in its actuated state during the establishment of the heretofore described holding path over lines 50. The remaining switches controlled by the CO relay are also closed, including switch 64, also designated CO3, which provides current from the power supply 65 to the primary coil of ST relay so that the ST relay is maintained in an actuated condition under the control of the CO relay. Subsequently, if the current path through the telephone lines 50 is open as, for example, by central office equipment, the CO relay releases and thereby shuts off the ST relay disconnecting the equipment in compliance with laws in certain states with respect to telephone engineering.

The primary winding of CO relay 61 has a resistance of approximately 600 ohms, i.e., the impedance which normally would appear across the telephone lines 50 when the phone is answered by lifting the receiver off the hook. The talking path is automatically established by the central office equipment when this impedance is sensed across the line. The ringing or generating current ceases and an uninterrupted potential of 48 volts appears across the telephone lines 50 from the central office equipment energizing the primary coil of the CO relay, and maintaining the relay in an energized state. This, in turn, maintains the holding current for the primary winding of ST relay 59 which is a direct current from the power supply 65. The ST relay is thus energized and conditions the screening system for operation.

In particular, the ST relay 59 closes switches to timers 67 and 70 shown in FIG. 2. Timer 67 is a short timer of, for example, 1 to 2 seconds whose output provides power to a pulse generator and tone generator 68, which consists of, for example, a flip-flop whose output alternately activates a two-tone generator as heretofore described with reference to FIG. 1. The purpose of the tone is to provide an indication to the calling station that the receiving station is coupled with a screening system thereby requiring the initiation of additional signals in order to complete the call. Alternatively, a recording can be used thereby dispensing with the pulse generator and tone generator 68. In that event, an NPN transistor in timer 67 is utilized directly to operate a recording or announcement to the caller. Timer 67 also provides a signal which inhibits any output from an inhibitor gate circuit 69. When an output from timer 67 ceases, the resulting output from inhibitor circuit 69 biases an SCR rectifier 70 which connects the bus bar for a second power supply 71 which provides power for all the subsequent circuitry in the telephone screening system.

Timer 72 is a timer of longer duration of, for example, 10 to 12 seconds, as heretofore described, and provides an output to OR gate 73. In the manner heretofore described with reference to FIG. 1, a signal at the output of OR gate 73 inhibits any output from the inhibitor gate circuit 74 so that no output is provided from inhibitor circuit 74 to the line adapter 52. After operation of the timer, through its duration of 10 to 12 seconds, and if no validation signal has appeared on line 75, there will be no output from OR gate 73. A signal therefore appears at the output of inhibitor gate 74. This signal is used to activate an SCR gate which provides passage of a current to the secondary winding of ST relay 59 which is reverse wound to nullify the core magnetization of the ST relay. The contacts of the ST relay are thereby opened which, in turn, opens the CO relay. As a result, all power supplies to the screening system are disconnected and the telephone lines 50 are opened, returning the equipment to its initial state for receiving calls.

In the event that a caller dials the correct signal code which is then validated as hereinafter described, the resulting validation signal at line 75 provides an output from OR gate 29 which, in turn, inhibits any output from inhibitor circuit 74, thereby maintaining the communication path between the telephone calling and receiving stations.

After the line adapter establishes a talking path between the telephone calling and receiving stations, the screening system is conditioned to receive additional signals initiated at the calling station for the duration of operation of timer 72, namely, 10 to 12 seconds. Additional signals initiated or dialed at the calling station appear across an audio transformer 76 which is coupled across the telephone lines 50. The potential signals induced in the secondary winding of the audio transformer 76 are amplified by amplifier 77. In digital dialing telephone system applications, the signal pulses pass through filter 78 and pulse shaper and amplifier 80 to a binary counter 81. The pulse signals initiated by a digital dialing system consist of pulse trains, each pulse train representing a digit and consisting of a series of pulses in number corresponding to the digit represented by the particular pulse train. The pulses of a particular pulse train are counted in binary counter 81 and passed to a digit formation gate 82 comprising conventional logic circuitry to provide a digital output signal representative of the number of pulses comprising the pulse train counted at binary counter 81. A digital signal at the output of digit formation gate 82 is connected to the input of a programmed selector matrix 83, which is a combinational logic matrix pre-set to two independent signal codes of three digits each. Thus, an output is provided from the matrix 83 only if a digit signal corresponding to one of the digits programmed in the matrix appears at the input to the matrix. One of the signal codes of three digits is designated the A code and is represented by three outputs from the selector matrix while the other signal code of three digits is designated the B code, and is also represented by three other outputs from the selector matrix.

The six possible outputs from programmed selector matrix 83 are connected to a digit combinator 84 which provides three outputs from six inputs. The combinator 84 cooperates with other logic circuitry as hereinafter described to pass either a three digit A signal code or a three digit B signal code without permitting combinations of digits from the A and B codes. Thus, in order for an output to appear at the outputs of combinator 84, the input digits to selector matrix 83 must correspond consistently with the A code or with the B code but not a mixture of the two, and must be in proper sequence. Signals at the three outputs of combinator 84 are gated by validation circuitry 85. Gating signals for the validation circuitry 85 are derived from a pulse train counter.

At the same time that the pulses of a particular pulse train are being counted at binary counter 81, the number of the pulse train itself appearing at the output of pulse shaper and amplifier 80 is counted. This is accomplished by a pulse sensor 86 consisting of a monostable-multivibrator normally biased to provide an output at line Y. When the multivibrator is excited by the presence of the pulse train, an output is provided over line X to a binary counter 87 consisting of a pair of flip-flops. When a pulse train is sensed, the output over line X consists of a single pulse, the multivibrator acting as a pulse stretcher. The duration of the pulse is also increased by a capacitor, one side of which is connected to the output line X from multivibrator 86. Thus, the filling in between pulses of the pulse train is provided by the multi-vibrator while the extension of duration of the resulting single pulse is provided by the capacitor which decays into the output line X. A diode is also provided to prevent back EMF'S to the vibrator. Each pulse train thus provides a trigger for binary counter 87 consisting of a pair of flip-flops. The two flip-flops are flipped each time a pulse train provides the single output pulse along line X. The purpose of counter 87 is therefore to count pulse trains and generate a gating and sequencing signal for the validation circuitry 85. Thus, the output from binary counter 87 is processed by a pulse sequencing gate 88 the output from which passes through polarity reversal circuitry 90 to the validation circuitry 85. The validation circuitry 85 in turn consists of a series of gates arranged so that an output from program selector matrix 83 and combinator 84 is permitted only at one of the three outputs having a number position corresponding to the number of the pulse train being processed. Validation of digits in proper sequence only is thereby assured. For example, if binary counter 99 has counted the pulses of the second pulse train, counter 87 would permit an output to pass from selector matrix 83 and combinator 84 only at the second output position.

Upon completion of processing any particular pulse train, the output of the Y line of multivibrator 86 in combination with output signals from circuitry 85 generates an output from counter reset 91. This output thus occurs only after termination of a pulse train. The output pulse signal from counter reset 91 inhibits any output from inhibitor gate 92, thereby momentarily shutting off the power supply to binary counter 81 so that the counter resets itself for processing the next pulse train. The inhibitor circuit 92 is normally conducting as no signal is appearing from the output of counter reset 91. The power supply maintains the four flip-flops in binary counter 81 in the appropriate states according to the number of pulses which have been counted in the particular pulse train. However, when the output from counter reset 91 becomes conducting, the inhibitor circuit blocks momentarily the power supply to the flip-flops in counter 81 which thereby reset themselves to the initial condition for receiving the next pulse train. Each subsequent pulse train and the pulses comprising the train are thereafter counted in a similar manner with counter reset occurring after each pulse train is processed.

After each pulse train there is a brief period of overlap in the outputs from both the X and Y lines from multi-vibrator 86 so that for a brief period the output along line X from the multivibrator maintains the flip-flops in the correct position while the output from line Y provides a potential to the gates in counter reset 91 in preparation for reset of the flip-flops. The output along line X from the multi-vibrator is processed to provide the gating signal to validation circuitry 85 so that an output is permitted from the selector matrix 83 and combinator 84 only at the output position corresponding to the number position of the pulse train being counted. By the time the binary counter has reset, the output from the validation circuitry corresponding to the counted digit disappears in preparation for counting the next digit.

In processing output signals from the program selector matrix 83 and combinator 84, the validation circuitry 85 is arranged to provide a validation signal only when the signal outputs corresponding to the digits of a particular code appear in proper sequence. For example, counting the first pulse train corresponding to the first digit of a sequence of digits, an output at the first output position of combinator 84 in conjunction with a first pulse from pulse train counter 87 conditions a second gate for receiving an output from the second output position of combinator 84. Only if an output signal potential appears at the second output position of combinator 84 in combination with the next gating signal generated from pulse train binary counter 87 will a third gate be conditioned to receive a signal from the third position of combinator 84. Upon receipt of a third output at the third output position of combinator 84 in conjunction with the next signal from pulse train binary counter 87, a final validation signal is provided along line 75 indicating validation of a code signal consisting of three digits of proper value and in proper sequence.

The telephone screening system of FIG. 2 is designed to arrange for validation of either of two signal codes of three digits each, either the A signal code or the B signal code. The logic circuitry further provides that depending upon which code is selected for validation by the calling station, a different type of indicator will be actuated at the receiving station. Validation of either the A code or the B code provides a validation signal at line 75 at the output from validation circuitry 85. The signal potential on line 75 is applied to one of the inputs to inhibitor gate 92. Depending upon whether the A code or B code has been initiated for validation, function direct circuitry 93 provides an input to the other side of inhibitor gate 92 in which the inverter element is present. The inputs to function direct circuitry 93 are connected in this example to the B code signal outputs from program selector matrix 83 and the function direction block 93 is arranged so that if the A code digit has been validated, no signal is provided to the input line of inhibitor gate 92 in which the inverter element is present. The signal potential at the other input to inhibitor gate 92 from line 75 therefore passes through the gate to actuate the A indicator control means 93. In the event that the B code digits are selected, an output is generated from function direction line 93 thereby inhibiting any output from inhibitor gate 92. The signal at the output of gate 93 is applied to the B indicator means 96. At the same time the validation signal potential 75 drives multivibrator 99 which can be used to alternate, for example, the tone generated by either of the indicator means 95 and 96. In coupling the outputs from program selector matrix 83 corresponding to the three digits of the B code signal, the three outputs are connected through a sequential AND gate so that an output potential is provided for driving gate 93 only if a series of three digits corresponding to the B line are selected. Whenever a digit sequence has been validated whether the A code signal or the B code signal, a validation signal is provided along line 75 to OR gate 73 to thereby maintain the talking path established between a telephone calling and receiving station as heretofore described.

An additional feature is provided in conjunction with the validation circuitry in order to prevent a combination of correctly selected digits belonging to both the A signal code and B signal code from generating a validation signal at line 75. Thus, this additional circuitry is provided so that a validation signal will be generated only when a correct A combination of three digits or a correct B combination of three digits are selected but not a mixture of digits from the two codes. The digits must consistently correspond with either the A code or the B code and not a combination. In order to prevent a combination of digits selected from both the A and B code signals from providing a validation signal on line 75 at the output from the validation circuitry, the B lines from the output of the programmed selector matrix 83 are tapped and connected to the A/B gate 97. Whenever a B digit is selected a signal potential is provided to AND gate 97*a*. At the same time, the other input to AND gate 97*a* is connected to the Y output from monostable-multivibrator 86, which provides a signal to AND gate 97*a* after completion of processing of a pulse train. Thus, an output is provided from A/B gate 97 whenever a B digit is selected. This output is connected to the input of a second A/B mix gate 98, the other input to which is derived from the output of gate 92. An output appears from gate 92 only when an A digit has been selected. Thus, an output is derived from A/B mix gate 98 whenever an A digit and a B digit have been selected for validation. The signal potential generated at the output of gate 98 is returned to the ST relay in the line adapter 52 and is applied to the secondary winding of the ST relay. Secondary winding is reverse wound to cancel the core magnetization and shut off the relay thereby cutting off the talking path between the calling and receiving station and returning the equipment at the telephone receiving station to its initial condition in preparation for receiving another call.

A power fail relay 100 is connected in series with a telephone dial in the manner heretofore described. Thus, in the event that the power supply fails the telephone bell is connected back into the circuitry across the telephone lines 50 to permit normal operation of the telephone.

In the event that the caller hangs up after correctly selecting the programmed digits entered on matrix 83, audio modulation caused by the restoration of the hand set of the calling station, results in a hang-up pulse which is connected to one input of the hang-up pulse gate 101. The other input to hang-up pulse gate 101 is derived from an inhibitor circuit gate 102, the normal input to which is derived from line 75, the validation signal line, and the inverted input to which is connected to the output from timer 72. Thus, an output is provided from inhibitor circuit gate 102 if the call has been validated and the timer 72 has run its course. If the caller thereafter hangs up, the combined inputs to gate 101 generate an output which passes through inverter 103 to provide a signal potential connected to the ST relay of the line adapter 52. This line is similarly connected to the secondary winding of the ST relay which is reverse wound in order to deactivate the relay and cut off the equipment. If the caller hangs up under other circumstances, the change in impedance across the telephone line is sensed at the central office and utilized to cut off the equipment and restore it to standby condition as heretofore described.

What is claimed is:

1. A system for screening incoming telephone calls for use in a conventional telephone system of telephone calling and receiving stations having alerting means and call addresses, and central office equipment comprising:

line adaptor means for receiving at a telephone station signals initiated by calling station and for establishing a communication path between said telephone receiving station and said calling station upon completion of the call address of the receiving station by the calling station;

first circuit means for preventing operation of the alerting means at the telephone receiving station after completion of the call address of the receiving station by the calling station;

and second circuit means for receiving and processing additional signals initiated by said calling station, said circuit means comprising means identifying said additional signals, means comparing said additional signals with a programmed code for validation, and means for actuating the alerting means of the receiving station upon validation of said additional signals.

2. A system for screening incoming telephone calls as set forth in claim 1 wherein is also provided means for signalling to the calling station that a screening system is coupled with the telephone receiving station.

3. A system for screening incoming telephone calls for use in a conventional telephone system of central office equipment and telephone calling and receiving stations in which the conventional telephone bells are disconnected from the telephone line, comprising:

line adapter means for receiving at a telephone station signals initiated by a calling station, and for establishing a communication path between the telephone receiving station and the calling station;

means for signalling the calling station that a screening system is coupled to the receiving station, thereby requiring initiation of additional signals at the calling station to complete the call;

means for receiving, processing and validating additional signals initiated by said calling station comprising:

means for identifying the pulses in a train of pulses and for formatting said pulses for input to a programmed matrix;

programmed matrix means for providing output signals only in response to input data corresponding to a preselected code;

means responsive to the output from said matrix means for indicating validation of additional signals initiated by said calling station;

and timing means for disconnecting the communication path established between the calling and receiving stations when validation of additional signals initiated at the calling station does not occur within a specified time.

4. A system for screening incoming telephone calls for use in a conventional telephone system of telephone calling and receiving stations and central office equipment comprising:

line adapter means for receiving at a telephone station signals initiated by a calling station and for establishing a communication path between said telephone receiving station and said calling station;

means for signaling to the calling station that a screening station is coupled with the telephone receiving station;

and circuit means for receiving and processing additional signals initiated by said calling station comprising:

means for counting the number of signal pulses in a train of pulses and for counting the number of pulse trains;

means formatting said counted pulses;

programmable matrix means having a predetermined code programmed therein, said formatting means being connected to the input of said matrix means, said matrix means being designed to pass only signals corresponding to the programmed code;

and means for generating a validation signal using the output from said matrix means.

5. A system for screening incoming telephone calls for use in a conventional telephone system of telephone calling and receiving stations and central office equipment comprising:

line adaptor means for receiving at a telephone station signals initiated by a calling station and for establishing a communication path between said telephone receiving station and said calling station;

means for signaling to the calling station that a screening system is coupled with the telephone receiving station;

and circuit means for receiving and processing additional signals initiated by said calling station comprising:

means for identifying the frequencies of signal pulses in a train of pulses;

means formatting said identified signals;

programmable matrix means having a predetermined code programmed therein, said matrix means being designed to pass only signals corresponding to the programmed code;

and means for generating a validation signal using the output from said matrix means.

6. A system for screening incoming telephone calls for use in a conventional telephone system of telephone calling and receiving stations and central office equipment comprising:

line adaptor means for receiving at a telephone station signals initiated by a calling station and for establishing a communication path between said telephone receiving station and said calling station;

means for signalling to the calling station that a screening system is coupled with the telephone receiving station thereby requiring additional signals to be initiated at the calling station in order to complete the call;

circuit means for receiving and processing additional signals initiated at the calling station comprising means for counting the number of signal pulses in a train of pulses and means for counting the number of pulses trains, each said pulse train corresponding to a digit;

means formatting each pulse train as a digit corresponding to the number of pulses comprising the train for input to a programmed selector matrix;

programmed selector matrix means having a plurality of inputs corresponding to digits and a plurality of outputs, each corresponding to a programmed digit;

code validation means responsive to the outputs from said selector matrix means to provide a validation signal upon receipt of sequential output signals from the selector matrix means in the sequence of the digits programmed therein;

means responsive to said validation signal to provide e an indication of validation of said additional signals generated at the calling station;

and timing means for disconnecting the communication path established between the calling station and the receiving station when a validation signal is not generated within a specified time period.

7. A system for screening incoming telephone calls as set forth in claim 6 wherein said code validation means includes means for sequencing validation of digit signals received at the input to said selector matrix comprising circuit means responsive to the number sequence of the digit pulse train being validated for gating the output from said selector matrix to permit an output signal only at the output for the position in the programmed digit sequence corresponding to the number position of the digit pulse being validated.

8. A system for screening incoming telephone calls as set forth in claim 6 wherein said programmed selector matrix is programmed with first and second sets of digits in specified sequence and wherein said selector matrix is provided with first and second sets of outputs corresponding to the digits of said first and second sequences of digits and wherein said code validation means is provided with means for generating first and second validation signals upon validation of input signals to the selector matrix corresponding in value and sequence to the first and second sets of programmed digits respectively, and wherein is also provided first and second indicating means for indicating validation of signals generated at said calling station corresponding to the first and second sets of programmed digits, respectively.

9. A system for screening incoming telephone calls for use in a conventional telephone system of telephone calling and receiving stations and central office equipment comprising:

line adapter means for receiving at a telephone station signals initiated by a calling station and for establishing a communication path between said telephone receiving station and said calling station;

means for signalling to the calling station that a screening system is coupled with the telephone receiving station, thereby requiring additional signals to be initiated at the calling station in order to complete the call;

circuit means for receiving and processing additional signals initiated at the calling station comprising means for identifying the frequency of said signals;

means formatting the signals as digits corresponding to the signal frequencies comprising said signals for input to a programmed selector matrix;

programmed selector matrix means having a plurality of inputs corresponding to digits and a plurality of outputs, one corresponding to each digit programmed in said matrix, said matrix being programmed with a first set of digits in a defined sequence, said matrix formed to provide an output signal upon receipt of an input signal corresponding to a programmed digit;

circuit validation means responsive to the outputs from said selector matrix to provide a validation signal upon receipt of sequential output signals from the selector matrix in the sequence of the digits programmed in the selector matrix;

means responsive to said validation signal to provide an indication of validation of said additional signals generated at the calling station;

and timing means for disconnecting the communication path established between the calling station and receiving station when a validation signal is not generated within a specified time period.

10. A telephone screening system for operation with a conventional telephone system of telephone sending and receiving stations having alerting means and call addresses in which a sending station issues an address signal to the receiving station and the receiving station has means for tying in a direct line contact when actuated after receiving the signal, the improvement comprising:

means at the receiving station responsive to the address signal from the transmitting station to activate said receiving station into a tie with the transmitting station;

means at the receiving station for preventing operation of the alerting means at the receiving station after activation of the tie between the calling and receiving stations;

a code discriminator at said receiving station coupled for receiving additional signals initiated at the sending station, said discriminator at said receiving station responsive to only a predetermined series of additional code pulses initiated at said sending station;

and means at said receiving station for actuating the alerting means when the predetermined code is sensed by said discriminator.

* * * * *